United States Patent
Vatani et al.

(10) Patent No.: US 12,240,172 B2
(45) Date of Patent: Mar. 4, 2025

(54) THREE-DIMENSIONAL ("3D") PRINTING APPARATUS WITH COUNTER-ROTATING ROLLER

(71) Applicant: Sakuu Corporation, San Jose, CA (US)

(72) Inventors: Morteza Vatani, Los Gatos, CA (US); Siamak Azizi, Los Gatos, CA (US); Seyed Mohammad Sajadi, San Jose, CA (US); Steven Z. Shi, Santa Clara, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

(21) Appl. No.: 17/375,781

(22) Filed: Jul. 14, 2021

(65) Prior Publication Data

US 2023/0020717 A1    Jan. 19, 2023

(51) Int. Cl.
| | | |
|---|---|---|
| *B29C 64/218* | (2017.01) | |
| *B29C 64/165* | (2017.01) | |
| *B29C 64/214* | (2017.01) | |
| *B29C 64/245* | (2017.01) | |
| *B29C 64/321* | (2017.01) | |
| *B29C 64/35* | (2017.01) | |
| *B29C 64/393* | (2017.01) | |
| *B33Y 10/00* | (2015.01) | |

(Continued)

(52) U.S. Cl.
CPC .......... *B29C 64/218* (2017.08); *B29C 64/165* (2017.08); *B29C 64/214* (2017.08); *B29C 64/245* (2017.08); *B29C 64/321* (2017.08); *B29C 64/35* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/245; B29C 64/40; B29C 64/214; B29C 64/218; B29C 64/165
See application file for complete search history.

(56) References Cited

U.S. PATENT DOCUMENTS

| | | | | |
|---|---|---|---|---|
| 5,902,537 A | * | 5/1999 | Almquist | ................ B29C 41/12 |
| | | | | 264/401 |
| 5,934,343 A | * | 8/1999 | Gaylo | ................... B29C 64/245 |
| | | | | 141/73 |

(Continued)

FOREIGN PATENT DOCUMENTS

| | | |
|---|---|---|
| CA | 2227672 A1 | 7/1998 |
| EP | 0906801 B1 | 8/2004 |

OTHER PUBLICATIONS

Barnes, Translation, 2018, English Translation WO-2019147239-A1 (Year: 2018).*

(Continued)

*Primary Examiner* — Nahida Sultana
(74) *Attorney, Agent, or Firm* — Arman Khosraviani (57) ABSTRACT

Examples relate to a print station of a three-dimensional ("3D") printing apparatus, and method of 3D printing, the print station including a substrate configured to hold a printed object, the substrate having a longitudinal axis, and a print system over the substrate, the print system including a powder distribution device including a blade-shaped end, and a powder uniformization device located at a distance from the powder distribution device along a direction parallel to the longitudinal axis.

20 Claims, 4 Drawing Sheets

(51) Int. Cl.
  *B33Y 30/00*   (2015.01)
  *B33Y 40/00*   (2020.01)
  *B33Y 50/02*   (2015.01)

(56) References Cited

U.S. PATENT DOCUMENTS

| | | | |
|---|---|---|---|
| 9,456,884 B2 | 10/2016 | Uckelmann | |
| 9,482,974 B2* | 11/2016 | Martin | G03G 9/0904 |
| 2011/0190923 A1 | 8/2011 | Matsui et al. | |
| 2016/0368054 A1* | 12/2016 | Ng | B33Y 50/02 |
| 2017/0054157 A1 | 2/2017 | Herchen et al. | |
| 2017/0071707 A1 | 3/2017 | Uckelmann et al. | |
| 2017/0072636 A1* | 3/2017 | Ng | B29C 64/153 |
| 2017/0252975 A1* | 9/2017 | Park | B33Y 40/00 |
| 2017/0341365 A1 | 11/2017 | De Lajudie et al. | |
| 2018/0001559 A1* | 1/2018 | Paternoster | B28B 1/001 |
| 2018/0126668 A1 | 5/2018 | El-Siblani et al. | |
| 2018/0236549 A1 | 8/2018 | Spears et al. | |
| 2018/0363147 A1* | 12/2018 | Kim | C23C 4/12 |
| 2019/0193150 A1 | 6/2019 | Hudelson et al. | |
| 2019/0375159 A1* | 12/2019 | Rogren | B29C 64/245 |
| 2020/0101664 A1* | 4/2020 | Prakash | B29C 64/245 |
| 2020/0346408 A1 | 11/2020 | Rode et al. | |
| 2022/0281011 A1* | 9/2022 | Van Deest | B22F 10/50 |

OTHER PUBLICATIONS

Daicho, "Powder-Material Supply Device for Three-Dimensional Molding Device", Oct. 8, 2015. Clarivate Analytics, entire document (Year: 2015).*
Aota, "Additive Manufacturing Apparatus", Aug. 22, 2019. Clarivate Analytics, entire document (Year: 2019).*
International Search Report and Written Opinion issued Sep. 23, 2022 in corresponding PCT/US2022/037160.
International Search Report and Written Opinion issued Sep. 23, 2022 in related PCT/US2022/037166.

* cited by examiner

THREE-DIMENSIONAL ("3D") PRINTING APPARATUS WITH COUNTER-ROTATING ROLLER

TECHNICAL FIELD

Various aspects of the current application relate to a three-dimensional ("3D") printing apparatus with improved powder deposition of thin layers. Specifically, various aspects relate to a 3D printing apparatus having a counter-rotating roller and powder feeder configured as a blade, both the counter-rotating roller and the blade having an independently adjustable height.

BACKGROUND

The introduction of three-dimensional ("3D") printing has generated a high degree of interest in the potential for a faster and more economical manufacturing approach. 3D printers may typically employ powder-bed technology, but with different approaches to fixing the powder into the desired configuration. Also, jetted binder 3D printers may benefit from the ability to rapidly deposit a full layer of powder and fix the desired pattern with a high-speed ink jet-like print head. The most significant limiting factor of a jetted binder-type 3D printer is the restriction to a single material within each layer.

Typical powder-bed 3D printing relies on the successive deposition of various layers on top of one another, or generate a foundation on which to deposit layers on a layer-by-layer basis. Depositing thin layers in the order of 25 µm to 200 µm on a substrate is typically difficult to achieve because of friction generated by the powders and low flowability of the powders. In addition, compacting a deposited thin layer is typically difficult to achieve. In some systems that deposit a powder or a slurry, in order to uniformize the deposited powder or slurry, existing systems typically rely on a blade to level the powder or slurry and to promote a uniform deposition in 3D printing systems. However, such blades, particularly flat blades, may impose sheer forces to the deposited powder or slurry that may disturb uniformity of the deposited powder or slurry and may thus prevent or hinder the formation of thin layers. Other systems rely on counter-rotating rollers to promote uniformity of the deposited powder. However, though they enable the use of lower flowability powders, counter-rotating rollers may suffer from the accumulation of powder in front of the roller, and non-uniform compacting of the powder because of, i.e., the sheer forces applied to the powder by the roller. In addition, as the deposited powder has a non-uniform thickness, the powder may accumulate in front of the roller and have a decreasing thickness the further it is from the roller. Also, as powder accumulates in front of the roller, the powder may be unable to rotate under the action of the roller and may instead slide under the roller, which increases the compaction of the powder, creates a non-uniform deposition of the powder, and results in a poor 3D printed product.

SUMMARY

In one general aspect, the instant application describes a print station of a three-dimensional ("3D") printing apparatus, the print station including a substrate configured to hold a printed object, the substrate having a longitudinal axis; and a print system over the substrate, the print system including a powder distribution device including a blade-shaped end, and a powder uniformization device located at a distance from the powder distribution device along a direction parallel to the longitudinal axis.

The above general aspect may include one or more of the following features. For example, a lower surface of the blade-shaped end of the powder distribution is parallel to the longitudinal axis. Additionally, the powder uniformization device may include a roller. The substrate may be movable with respect to the print system along the longitudinal axis, and the print system may be static with respect to the longitudinal axis. Alternatively, the print system may be movable with respect to the substrate along the longitudinal axis, and the substrate may be static with respect to the longitudinal axis. Alternatively, both the print system and the substrate may be movable with respect to each other along the longitudinal axis.

For another example, a distance between a point on the roller and the blade-shaped end along a direction parallel to the longitudinal axis is equal to about one radius of the roller, and the point is a lowest contact point of the roller to the substrate. The print station may further include a first adjustment mechanism configured to control a powder feeder gap between a lowest portion of the powder distribution device and the substrate. Additionally or alternatively, the print station may further include a second adjustment mechanism configured to control a roller gap between a lowest portion of the counter-rotating roller and the substrate. The powder feeder gap and the roller gap may be independently adjustable. Alternatively or additionally, the powder feeder gap may be dynamically adjusted to control uniform powder in front of the roller.

The print station may further include a vibrating device configured to vibrate at least one of the roller and the substrate at a rapid frequency, the rapid frequency including an ultrasonic frequency. A surface of the roller may be coated by a coating having a thickness in a range of 100 nm to 500 µm. The coating may include at least one of a plastic coating, a Teflon coating, and an anodized coating. The print station may further include a roller cleaning device configured to remove residual powder from the roller. The roller cleaning device may be located above the roller in a direction substantially perpendicular to the longitudinal axis. The roller may be a single roller in the print station.

In another general aspect, the instant application describes a method for three-dimensional ("3D") printing at a print system, the print system including a substrate and a print station, the method including arranging the print system over the substrate, the substrate having a longitudinal axis, distributing a powder on the substrate through a powder feeding device of the print system, contemporaneously flattening the powder by a blade integrated into the powder feeding device, the flattening including maintaining a constant thickness of the powder deposited on the substrate, transporting the powder to a uniformizing device in a moving direction of the powder, the moving direction being a direction parallel to the longitudinal axis, uniformizing the powder by the uniformizing device located at a distance from the powder feeding device along the direction parallel to the longitudinal direction, and transferring the powder to a next station in the 3D printing.

In another aspect, transferring the powder to the next station in the 3D printing comprises transferring the powder to one of a printing device, a fixing device, and a transporting device.

In a further aspect, uniformizing the powder by the uniformizing device comprises uniformizing the powder by a roller configured to apply a pressure on the powder transported thereto. Alternatively or additionally, uniformizing the powder by the roller comprises rotating the roller in a direction counter to the moving direction of the powder at a point of contact of the roller and the powder. Alternatively, the method further includes adding at least one of a lubricating agent and a wetting agent to the powder prior to the powder being deposited on the substrate, the at least one lubricating agent and wetting agent being configured to increase a flowability of the powder prior to the uniformizing of the powder. Alternatively, the method further includes vibrating at least one of the roller and the substrate at a rapid frequency, the rapid frequency including an ultrasonic frequency.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various implementations will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Current 3D printing systems present a technical problem because blades used to render the deposited powder uniform over a printed substrate may generate sheer forces that may prevent or hinder the printing of thin layers of powder, e.g., in the range of 100 μm. Furthermore, rollers used to compact the deposited powders also introduce sheer forces that may prevent or hinder the uniform printing of thin layers of powder To address these technical problems and more, in an example, this description provides a technical solution rendering the deposited powder uniform by using a powder feeder configured as an adjustable blade in conjunction with a counter-rotating roller positioned at a desired distance from the powder feeder. To further address the above technical problems, in another example, this description provides another technical solution independently adjusting the gap between the powder feeder and the surface of the substrate, and the gap between the counter-rotating roller and the surface of the substrate.

Various implementations include a print station of a three-dimensional ("3D") printing apparatus, and method of 3D printing, the print station including a substrate configured to hold a printed object, the substrate having a longitudinal axis, and a print system over the substrate, the print system including a powder distribution device having a blade-shaped end, and a powder uniformization device located at a distance from the powder distribution device along a direction parallel to the longitudinal axis.

Various implementations include a powder deposition arrangement configured to facilitate uniform powder deposition of thin layers, where the powder is fed by a powder feeder that includes an adjustable blade, and the powder deposition arrangement also includes a counter-rotating roller located at a given distance from the powder feeder and used to compact the powder material during the process of 3D printing. In addition, the gap between the powder feeder and the substrate may be adjustable to increase the quality of the powder deposition. The gap between the powder feeder and the surface of the substrate defines the quality of the deposition by, e.g., minimizing the compaction of the powder. As another example, the gap between the counter-rotating roller and the substrate is also adjustable to a desired value in order to adjust the printed thickness as well as quality of the thin layer deposition during the process of 3D printing, the roller gap being independently adjustable from the gap between the powder feeder and the surface of the substrate. For example, the roller gap may define the final thickness of the printed layer, while, as discussed above, the powder feeder gap may define the quality of the deposition.

Figure 1:
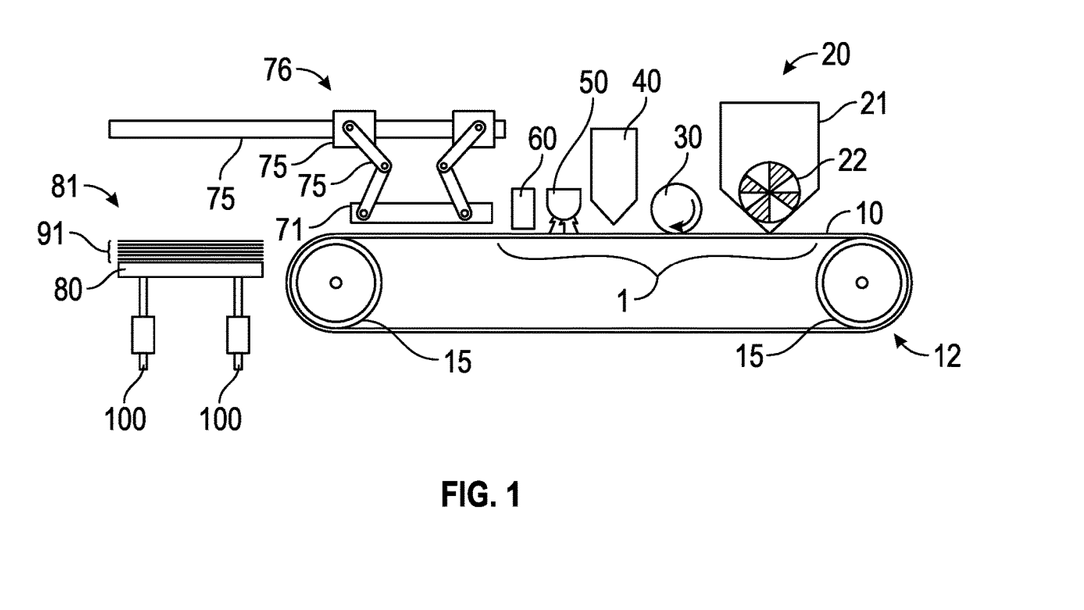
FIG. 1 illustrates a schematic representation of a typical 3D printing apparatus including a print station and a continuous substrate.

FIG. 1 schematically depicts a typical print station and an assembly apparatus with a continuous substrate. The print station can include a carrier device 12. In some implementations, the carrier device 12 can include a conveyor configured to transport or move materials from a first position to a second position. The conveyor can include a belt and two rotating elements 15, configured to rotate in the same direction to advance the belt in a certain direction. The carrier device 12 can have a distal end and a proximal end. The carrier device 12 can transport a substrate 10 from the distal end to the proximal end. The substrate 10 can be positioned by the two rotating elements 15 to a location where a transfer device 76 can transport a printed layer (not shown) to a build substrate 80.

At the distal end of the carrier device 12, a dispensing device 20 can be provided. The dispensing device 20 can simply be a dispenser configured to dispense fluidized material. The dispensing device 20 can include a materials storage 21 and a dispensing controller 22. The dispensing controller 22 can be configured to meter an amount of fluidized material deposited onto the substrate 10. The dispensing controller 22 can also be configured to precisely control the uniformity of the deposited fluidized material.

Near the distal end of the carrier device 12, a compaction device 30 can be provided. In some implementations, the compaction device 30 can include a roller, made up of a hardened metal material designed as a cylindrical tube. In some implementations, the compaction device 30 can be configured to compact a fluidized material to a high density of at least 40% of the theoretical density of the fluidized material. The compaction device 30 rotates in the direction of movement of the substrate, i.e., in a clock-wise direction as illustrated in FIG. 1.

Near the distal end of the carrier device 12, a printing device 40 can be provided. The printing device 40 can be configured to deposit a liquid binding material to fix a precise pattern into the fluidized material. The precise pattern can be fixed into the fluidized material by binding the fluidized material into a connected and robust mass. In some implementations, the printing device 40 can be an ink jet type print head under direct control of a computer (not shown).

Near the center of the carrier device 12, a fixing device 50 can be provided. The fixing device 50 can be configured to solidify the liquid binding material, thus fixing the fluidized material exposed to the liquid binding material in a robust solid pattern. The fixing device 50 can be a source of radiant energy that may interact with the liquid binding material to cause it to become solid. In some implementations, the radiant energy can be IR radiation, UV radiation, electron beam, or other known radiation types. It should be understood the fixing device 50 does not need to be limited to the disclosed radiation types, as this list is presented for exemplary implementations and not intended to be exhaustive. Alternatively, the fixing device 50 can include a device for dispersing a reactive agent configured to react with the liquid binding material and the fluidized material to convert the fluidized material to a robust mass.

A fluidized materials removal device 60 can be provided downstream from the fixing device 50. The fluidized materials removal device 60 can be configured to remove all of the fluidized material deposited and compacted onto the substrate 10. The fluidized materials removal device 60 can remove the fluidized material deposited and compacted onto the substrate, but not fixed in place by the liquid binder material.

A transfer device 76 can be implemented downstream from the fluidized materials removal device 60 in the assembly apparatus. The transfer device 76 can be configured to move a printed layer (not shown) from the substrate 10. The printed layer can be moved from the substrate 10 to a build substrate 80, or to the top of a stack of previously positioned layers 91. The transfer device 76 can also include a pick-up assembly. The pick-up assembly can include an attachment device 71 configured to remove a printed layer from the substrate 10. The attachment device 71 can include a vacuum device or an adhesive device to overcome the force holding the printed layer to the substrate 10. The transfer device 76 may also include a translation device 75 configured to move the printed layer from the substrate 10 to an assembly apparatus 81.

The elevator device 100 is configured to maintain the level of the top of the stack of previously positioned layers 91. In an implementation, the elevator device 100 can include a linear motor device.

Figure 2:
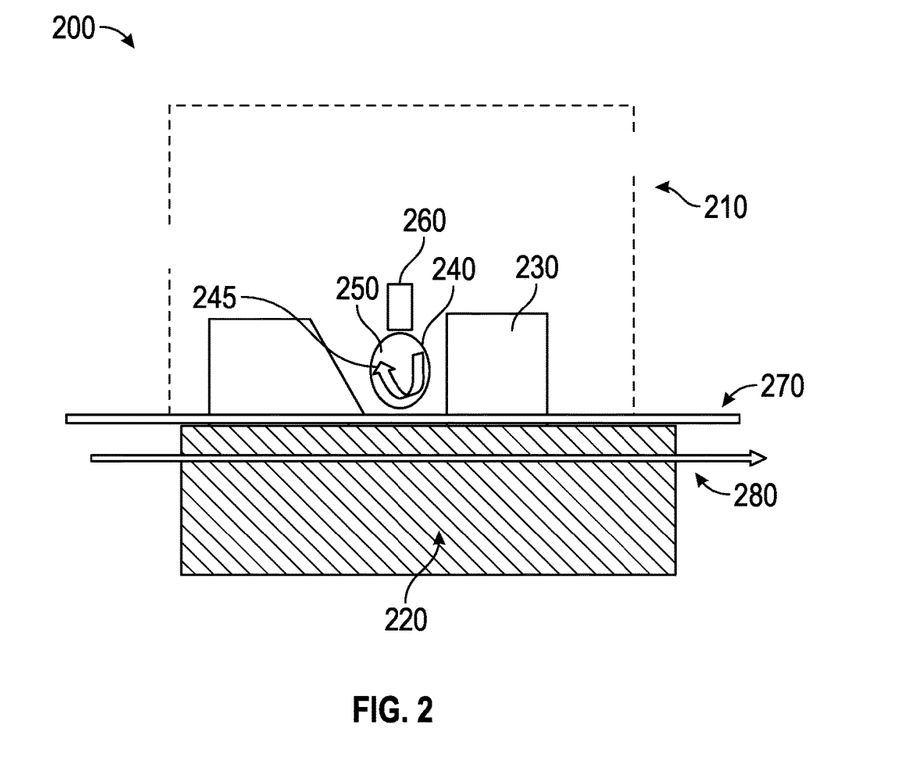
FIG. 2 illustrates a schematic representation of a print station in accordance with various example implementations.

FIG. 2 illustrates a schematic representation of a print station and assembly apparatus with a continuous substrate for depositing thin layers of powder on a substrate, in accordance with various example implementations. With reference to FIG. 1, the printing system 210 may correspond to, e.g., the combination of the dispensing device 20 and the compaction device 30. In FIG. 2, the print station 200 includes a support 220 and a printing system 210. The printing system 210 may be movable while the support 220 may be fixed, or the printing system 210 may be fixed while the support 220 is movable. The printing system 210 may include a top support 230 configured to decrease or minimize non-uniform deposition, an adjustable roller 240, and a powder feeder 250. The printing system 210 may also include a roller cleaner 260 to clean the roller 240 of any residual powder that may remain thereon and that may contaminate the roller 240.

In operation, the powder is provided by the powder feeder 250 while the printing system 210 is moving right to left relatively to the support 220 in the direction of arrow 280, or the support 220 is moving left to right relatively to the printing system 210, in a direction opposite to the arrow 280. Accordingly, when the powder is provided by the powder feeder 250, the powder is subsequently submitted to the rotating action of the roller 240. For example, the roller 240 is a counter-rotating roller, i.e., the roller 240 rotates in a direction 245 that is opposite to the direction of the arrow 280 at the point of contact between the roller 240 and the powder deposited on the substrate 270. The counter-rotating roller 240 agitates the powder after the powder is deposited on the substrate 270. Accordingly, the powder that is provided by the powder feeder 250 is uniformized by the action of the counter-rotating roller 240.

The counter-rotating roller 240 applies a pressure to the powder after the powder is deposited on the substrate 270. Accordingly, the powder that is provided by the powder feeder 250 is uniformized by the action of the counter-rotating roller 240. The counter-rotating roller 240 may installed with an adjustable angle so that the accumulated powder may be released behind the roller.

Figure 3A:
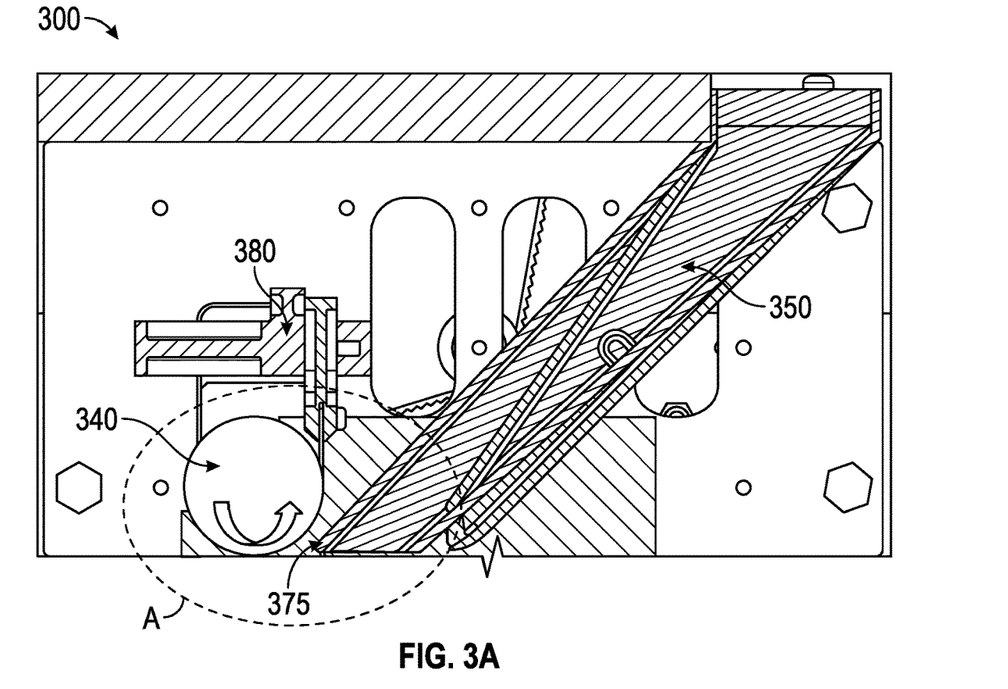
FIG. 3A illustrates a portion of a print station including a powder feeder and a counter-rotating roller, in accordance with various example implementations.

FIG. 3A illustrates a portion of a print station 300 including a powder feeder and a counter-rotating roller, in accordance with various example implementations. With reference to FIG. 1, the print station may correspond to, e.g., the combination of the dispensing device 20 and the compaction device 30. With reference to FIG. 2, the print station may correspond to, e.g., the print station 200. In various implementations, the print station 300 includes a powder feeder 350, and the powder feeder 350 has a blade 375 integrated or included therein, so that when the powder exits the powder feeder 350 at the blade 375 located at the exit point of the powder feeder 350, the powder is flattened and at least partially uniformized by the blade 375. FIG. 3C provides an illustration of the blade 375. For example, the blade 375 ensures that the thickness of the powder that is deposited by the powder feeder 350 remains substantially the same. In addition, for example, a counter-rotating roller 340 is positioned at a given distance from the blade 375, the counter-rotating roller 340 further planarizing and uniformizing the powder that exits the powder feeder 350 at the blade 375. For example, the counter-rotating roller 340 may enable a uniform deposition of less flowable powders. The blade 375 may ensure that the thickness of the powder that is deposited by the powder feeder 350 remains substantially the same as it approaches the counter-rotating roller 340. As a result, powder accumulation in front of the counter-rotating roller 340 may be avoided or reduced. The powder feeder 350 may also ensure the ability to maintain and/or reduce the sheer forces applied to the printed powder during powder deposition, and may thus allow the 3D printing of thin layers, e.g., in the range of 100 μm, on the substrate such as, e.g., substrate 10 illustrated in FIG. 1. The powder feeder 350, which includes the blade 375, may have an adjustment arrangement configured to adjust the gap between the powder feeder 350/blade 375 and the surface of the substrate. The counter-rotating roller 340 may also independently have an adjustment arrangement configured to adjust the gap between the counter-rotating roller 340 and the surface of the substrate.

In various implementations, the print station 300 may further include an alignment roller cleaner 380 configured to clean the roller 340. For example, the roller cleaner 380 can remove unwanted powder particles that may remain on the roller 340 after the roller 340 distributed the powder. In addition, as the print station 300 may be movable with respect to the underlying substrate such as, e.g., substrate 10 illustrated in FIG. 1, the blade 375 is also movable with respect to the substrate. In other examples, the substrate is movable with respect to the print station 300, and thus movable with respect to the blade 375.

In various implementations, the counter-rotating roller 340 rotates at a speed in the range of 10 RPM to 300 RPM. If the roller 340 has a rotating speed that is greater or lower than this range, then the resulting quality of the powder deposition may be deteriorated because the uniformity of the deposited powder may be affected by the counter-rotating roller.

In various implementations, a lubricant agent and/or a wetting agent is added to the powder being distributed by the powder feeder 350 in order to, e.g., increase the flowability of the powder that is deposited in front of the counter-rotating roller 340. Adding such lubricant agent and/or a wetting agent may improve the compaction of the powder and minimize or control the tension between the substrate and the later-applied layers. Specifically, the lubricating agent facilitates obtaining a uniform compaction of the powder that is presented to the roller 340. In implementations, the print station 300 may include a single roller 340, and may avoid having to have an additional compacting roller that rotates in the direction of movement of the powder, i.e., rotates in the opposite direction to the rotation direction of roller 340. Example lubricating agents and wetting agents include water and isopropyl alcohol.

Figure 3B:
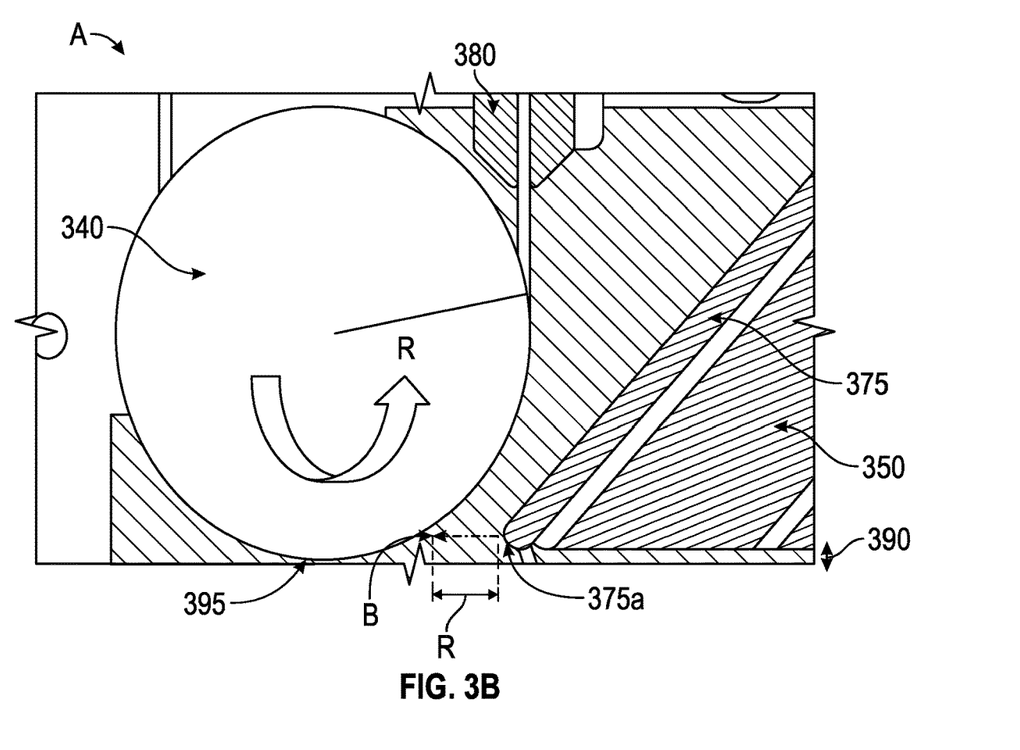
FIG. 3B illustrates a detailed portion of the print station illustrated in FIG. 3A, in accordance with various example implementations.
Figure 3C:
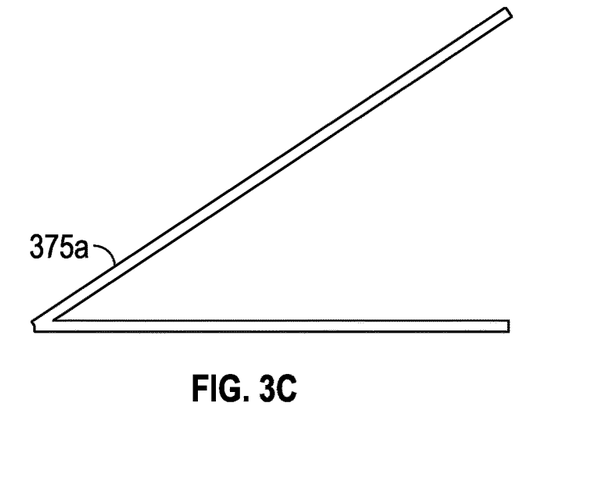
FIG. 3C illustrates a blade, in accordance with various example implementations.

FIG. 3B illustrates a detailed portion of the print station illustrated in FIG. 3A, in accordance with various example implementations. In various implementations, the portion referred to as "A" in FIG. 3A is discussed in greater detail below. In FIG. 3B, the roller 340 has a radius R, and a distance between a point of contact of the blade 375, labeled as "B," and the end point of the blade 375a may be equal to about R. For example, if the distance between the point of contact "B" of the blade 375 and the end point of the blade 375a is higher than R, then the resulting powder may have poor uniformity. Also, if the distance between the point of contact "B" of the blade 375 and the end point of the blade 375a is greater than R, then the powder may undergo rotation in front of the counter-rotating roller 340, which results in a poor powder deposition such as, e.g., non-uniform deposition.

In various implementations, a gap 390 between the lowest portion of the blade 375 and the surface of the substrate (not shown) may be adjustable as desired. Accordingly, the gap 390 between the substrate and the blade 375, or between the deposited powder and the blade 375 may be maintained at a desired constant, or substantially constant, value, which may allow to avoid or reduce contamination of the surface of the substrate by the powder. For example, in order to deposit a single layer of powder, the gap 390 between the substrate and the blade 375 may be adjusted accordingly. The gap 390 between the powder feeder and the surface of the substrate defines the quality of the deposition. As an example, the counter-rotating roller 340 may also have an adjustable gap 395 between the lowermost surface thereof and the substrate, the roller gap 395 being independently adjustable from the gap 390 between the powder feeder and the surface of the substrate. In addition, the roller gap 395 defines the final thickness of the printed layer, while, as discussed above, the powder feeder gap 390 defines the quality of the deposition by, e.g., minimizing the compaction of the powder. For example, the powder feeder gap 390 is greater than the roller gap 395. For example, the powder feeder gap 390 is greater than the roller gap 395 and equal to or lower than one-third of the diameter of the counter-rotating roller 340. If the powder feeder gap 390 is greater than one-third of the diameter of the counter-rotating roller 340, then the powder may undergo rotation in front of the counter-rotating roller 340, which results in a poor powder deposition such as, e.g., non-uniform deposition.

In various implementations, the counter-rotating roller 340 may be coated by a coating (not shown). For example, the coating may be an anodized coating, a Teflon coating, or a plastic coating. A plastic coating may minimize the friction between the powder and the counter-rotating roller 340, and may also minimize contamination of the counter-rotating roller 340 by the powder. For example, during operation of the print station 300, the powder that is distributed by the powder feeder 350 and rotated by the counter-rotating roller 340 may adhere to the surface of the counter-rotating roller 340 and may contaminate subsequent layers of the 3D printed product. A plastic coating on the counter-rotating roller 340 may decrease such contamination. Similarly, an anodized coating to the counter-rotating roller 340 may provide a decreased contamination, and may also reduce friction between the surface of the roller 340 and the substrate. As an example, the coating may reduce electrostatic charging of the powder during operation of the print station 300. As another example, a thickness of the coating is in a range of 0.1 nm to 500 μm.

Figure 4A:
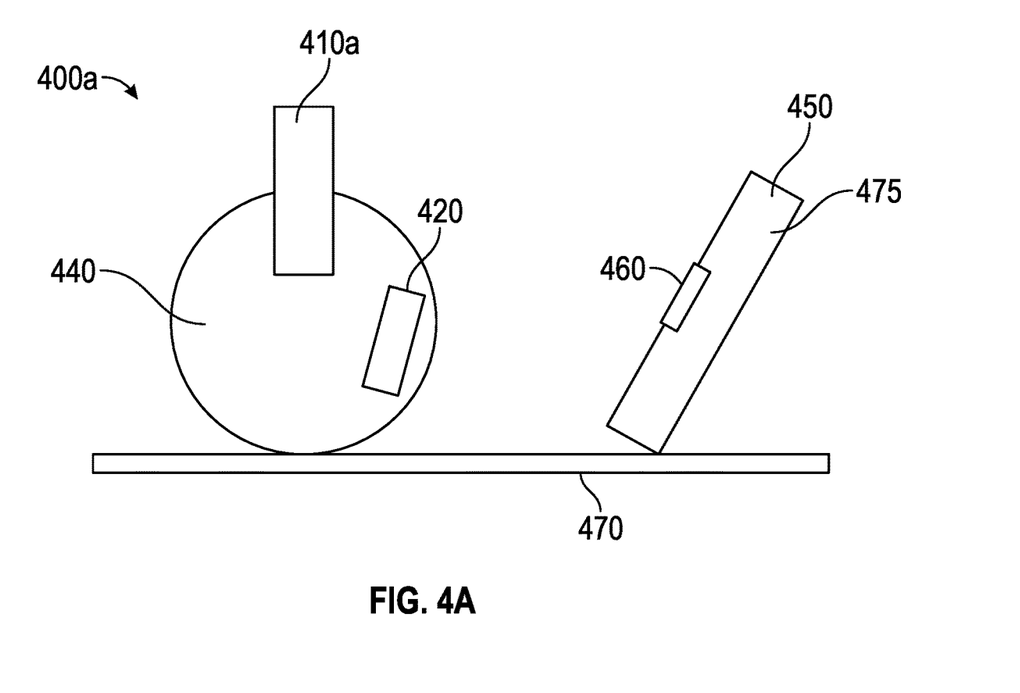
FIGS. 4A-4B illustrate schematic representations of a print station in accordance with various example implementations.
Figure 4B:
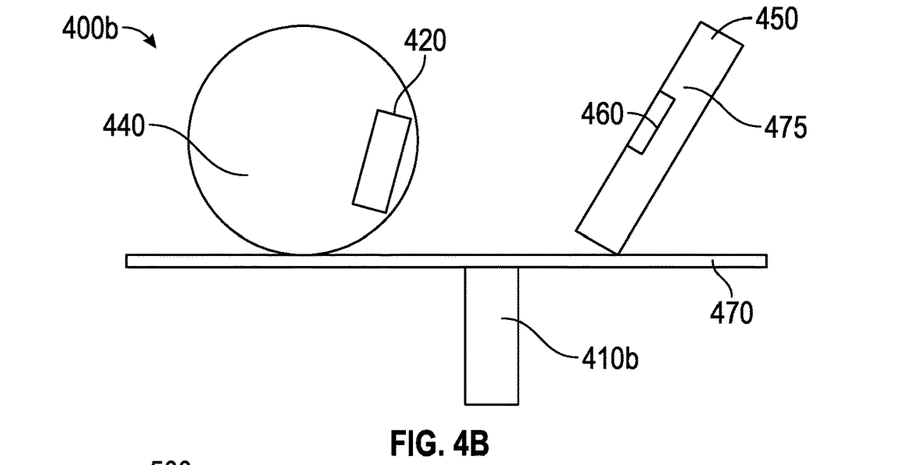

FIGS. 4A-4B illustrate schematic representations of a print station in accordance with various example implementations. In FIG. 4A, the print station 400a includes roller 440, blade 475, and substrate 470. With reference to FIG. 3A, roller 440 may correspond to roller 340, and blade 475 may correspond to blade 375, and with reference to FIG. 2, substrate 470 may correspond to substrate 270. In FIG. 4A, the print station 400 further includes a vibrating device 410a. For example, the vibrating device 410a is functionally connected, e.g., integrally connected, to the roller 440, and may be configured to vibrate at a rapid frequency in order to make the roller 440 vibrate at the rapid frequency. For example, the vibrating device 410a may vibrate at, e.g., an ultrasonic frequency and thus makes the roller 440 vibrate at the ultrasonic frequency. As a result of the roller 440 vibrating at a rapid frequency, e.g., at an ultrasonic frequency, the powder that is in contact with the roller 440 during the counter-rotation of the roller 440 may be better distributed, and agglomeration of the powder at the point of contact with the roller 440, or in the vicinity of the point of contact with the roller 440, may be reduced, significantly reduced, or eliminated.

In FIG. 4B, the print station 400b includes roller 440, powder feeder 450 that includes blade 475, and substrate 470. With reference to FIG. 3A, roller 440 may correspond to roller 340, powder feeder 450 may correspond to powder feeder 350, and blade 475 may correspond to blade 375, and with reference to FIG. 2, substrate 470 may correspond to substrate 270. In FIG. 4B, the print station 400b further includes a vibrating device 410b. For example, the vibrating device 410b is functionally connected, e.g., integrally connected, to the substrate 470, and may be configured to vibrate at a rapid frequency in order to make the substrate 470 vibrate at the rapid frequency. For example, the vibrating device 410b may vibrate at, e.g., an ultrasonic frequency and thus makes the substrate 470 vibrate at the ultrasonic frequency. As a result of the substrate 470 vibrating at a rapid frequency, e.g., at an ultrasonic frequency, the powder that is deposited by the blade 475 on the substrate 470 may be better distributed on the substrate 470, and agglomeration of the powder at the point of contact with the roller 440, or in the vicinity of the point of contact with the roller 440, may be reduced, significantly reduced, or eliminated. In various implementations, the print station 400a/400b may include both vibrating devices 410a and 410b, in which case both the roller 440 and the substrate 470 are made to vibrate at the rapid frequency during deposition and distribution of the powder.

In various implementations, the powder feeder 450 may enclose therein one or more devices or elements 460 designed to control or influence the environment where the powder is stored before being distributed. For example, the devices or elements 460 may be any combination of a dehumidifier, one or more heating elements, and an inert gas provider configured to provide an inert gas inside the powder feeder 450. Any one of these devices or elements 460, whether alone or in combination, may be enclosed in the powder feeder 450 in order to ensure that the powder remains sufficiently dry and un-agglomerated, and thus to ensure a sufficient quality of the resulting printed layer.

In various implementations, the counter-rotating roller 440 may include an electric charging mechanism 420 that delivers an electric charge to the surface of the counter-rotating roller 440 to remove any powder that may adhere to the surface of the counter-rotating roller 440 via static charging. Alternatively, the electric charge delivered to the surface of the counter-rotating roller 440 by the electric charging mechanism 420 may prevent the powder from adhering to the surface of the counter-rotating roller 440 via static charging.

Figure 5:
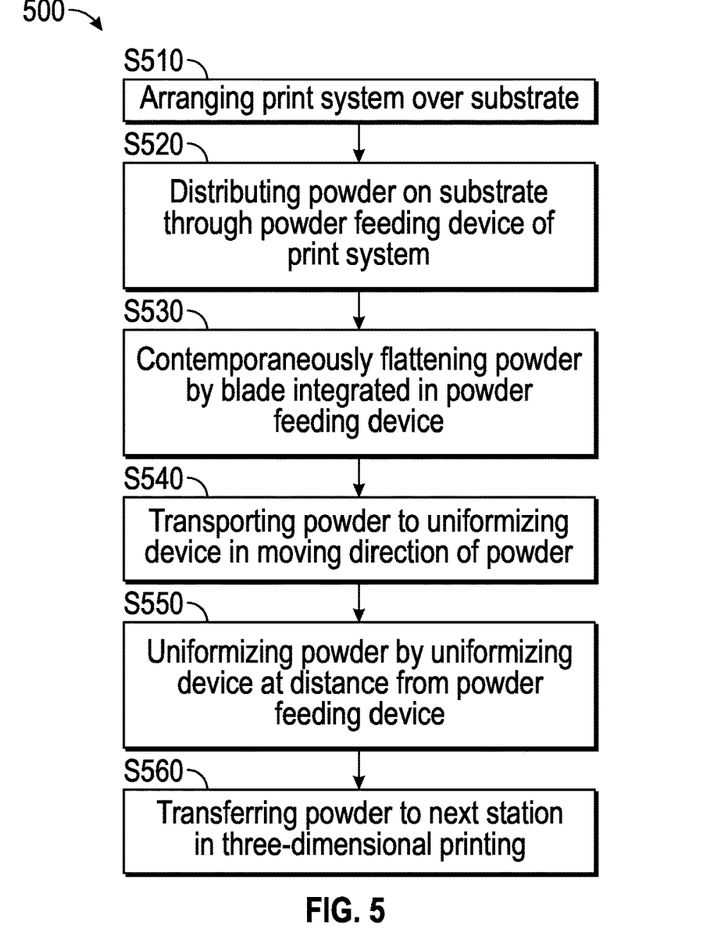
FIG. 5 illustrates a method of operation of a 3D print station in accordance with various example implementations.

FIG. 5 illustrates a method of operation of a print station in a 3D printing apparatus, in accordance with various example implementations. In the process 500 of FIG. 5, at S510, a print system is arranged over a substrate, the substrate having a longitudinal axis. With reference to FIG. 2, the printing system 210 is arranged over the substrate 270 or the support 280. The process 500 continues to S520, where a powder is distributed on the substrate through a powder feeding device of the print system. For example, the powder is distributed on the powder bed of a print station that is part of a 3D printing apparatus. With reference to FIGS. 3A and 3B, the powder is distributed from the powder feeder 350. In implementations, a lubricating agent and/or a wetting agent may be added to the powder that is distributed at S520, the lubricating agent and/or wetting agent being configured to increase the flowability of the powder and the compaction uniformity. By controlling the surface tension of the powder, the lubricating agent and/or wetting agent may also prevent or reduce powder sticking to the roller.

In various implementations, as the powder is distributed at S520, the process 500 continues to S530 by contemporaneously or simultaneously flattening the distributed powder via, e.g., a blade integrated into the powder feeding device. For example, the flattening at S530 may maintain a constant thickness of the powder distributed on the substrate. With reference to FIGS. 3A and 3B, as the powder is distributed via the powder feeder 350, the powder is contemporaneously flattened by the blade 375. The process 500 continues to S540 where the powder is transported to a uniformizing device along a moving direction of the powder, the moving direction being parallel to the longitudinal axis of the substrate. For example, the uniformizing device may be a roller located at a desired distance from the blade 375, the roller being configured to apply a pressure on the powder. The process 500 continues to S550 where the powder is uniformized by a uniformizing device which may be, e.g., a roller configured to apply a pressure on the transported powder. With reference to FIGS. 3A and 3B, the powder is uniformized by the roller 340 which rotates and applies pressure on the powder. In implementations, the roller 340 rotates in a direction that is counter-clockwise, or counter to the moving direction of the powder at the point of contact between the roller 340 and the powder. The process 500 continues to S560, where the powder is transferred to the next station in the 3D printing process such as, e.g., printing in a printing device, fixing in a fixing device, or transferred to a transfer device. With reference to FIG. 1, the powder may be transferred to the printing device 40, the fixing device 50, or the transfer device 76.

In the following, further features, characteristics, and advantages of the instant application will be described via the following items:

Item 1: A print station of a three-dimensional ("3D") printing apparatus, the print station comprising: a substrate configured to hold a printed object, the substrate having a longitudinal axis; and a print system over the substrate, the print system including: a powder distribution device including a blade-shaped end; and a powder uniformization device located at a distance from the powder distribution device along a direction parallel to the longitudinal axis.

Item 2: The print station of item 1, wherein a lower surface of the blade-shaped end of the powder distribution is parallel to the longitudinal axis.

Item 3: The print station of any one of items 1 and 2, wherein the powder uniformization device comprises a roller.

Item 4: The print station of any one of items 1-3, wherein the substrate is movable with respect to the print system along the longitudinal axis; and the print system is static with respect to the longitudinal axis.

Item 5: The print station of any one of items 1-4, wherein the print system is movable with respect to the substrate along the longitudinal axis; and the substrate is static with respect to the longitudinal axis.

Item 6: The print station of any one of items 1-5, wherein both the print system and the substrate are movable with respect to each other along the longitudinal axis.

Item 7: The print station of any one of items 1-6, wherein a distance between a point on the roller and the blade-shaped end along a direction parallel to the longitudinal axis is equal to about one radius of the roller.

Item 8: The print station of any one of items 1-7, wherein the point is a lowest contact point of the roller to the substrate.

Item 9: The print station of any one of items 1-8, further comprising a first adjustment mechanism configured to control a powder feeder gap between a lowest portion of the powder distribution device and the substrate.

Item 10: The print station of any one of items 1-9, further comprising a second adjustment mechanism configured to control a roller gap between a lowest portion of the counter-rotating roller and the substrate.

Item 11: The print station of any one of items 1-10, wherein the powder feeder gap and the roller gap are independently adjustable.

Item 12: The print station of any one of items 1-11, wherein the powder feeder gap is dynamically adjusted to control uniform powder in front of the roller.

Item 13: The print station of any one of items 1-12, further comprising a vibrating device configured to vibrate at least one of the roller and the substrate at a rapid frequency.

Item 14: The print station of any one of items 1-13, wherein the rapid frequency comprises an ultrasonic frequency.

Item 15: The print station of any one of items 1-14, wherein a surface of the roller is coated by a coating having a thickness in a range of 100 nm to 500 µm.

Item 16: The print station of any one of items 1-15, wherein the coating comprises at least one of a plastic coating, a Teflon coating, and an anodized coating.

Item 17: The print station of any one of items 1-16, further comprising a roller cleaning device configured to remove residual powder from the roller.

Item 18: The print station of any one of items 1-17, wherein the roller cleaning device is located above the roller in a direction substantially perpendicular to the longitudinal axis.

Item 19: The print station of any one of items 1-18, wherein the roller is a single roller in the print station.

Item 20: A method for three-dimensional ("3D") printing at a print system, the print system including a substrate and a print station, the method comprising: arranging the print system over the substrate, the substrate having a longitudinal axis; distributing a powder on the substrate through a powder feeding device of the print system; contemporaneously flattening the powder by a blade integrated into the powder feeding device, the flattening including maintaining a constant thickness of the powder deposited on the substrate; transporting the powder to a uniformizing device in a moving direction of the powder, the moving direction being a direction parallel to the longitudinal axis; uniformizing the powder by the uniformizing device located at a distance from the powder feeding device along the direction parallel to the longitudinal direction; and transferring the powder to a next station in the 3D printing.

Item 21: the method of item 20, wherein transferring the powder to the next station in the 3D printing comprises transferring the powder to one of a printing device, a fixing device, and a transporting device.

Item 22: the method of any one of items 20 and 21, wherein uniformizing the powder by the uniformizing device comprises uniformizing the powder by a roller configured to apply a pressure on the powder transported thereto.

Item 23: the method of any of items 20-22, wherein uniformizing the powder by the roller comprises rotating the roller in a direction counter to the moving direction of the powder at a point of contact of the roller and the powder.

Item 24: the method of any of items 20-23, further comprising adding at least one of a lubricating agent and a wetting agent to the powder prior to the powder being deposited on the substrate, the at least one lubricating agent and wetting agent being configured to increase a flowability of the powder prior to the uniformizing of the powder.

Item 25: the method of any of items 20-24, further comprising vibrating at least one of the roller and the substrate at a rapid frequency.

Item 26: the method of any of items 20-25, wherein the rapid frequency comprises an ultrasonic frequency.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A print station of a three-dimensional ("3D") printing apparatus, the print station comprising:
    a substrate configured to hold a printed object, the substrate having a longitudinal axis; and
    a print system over the substrate, the print system including:
        a powder distribution device including a blade-shaped end which is a lowest portion of the powder distribution device;
        a powder uniformization device, comprised of a roller, located at a distance from the powder distribution device along a direction parallel to the longitudinal axis; and
        a vibrating device configured to vibrate the roller at a rapid frequency,
        wherein a surface of the roller is coated by a coating having a thickness in a range of 100 nm to 500 um and comprising at least one of a plastic coating, a Teflon coating, and an anodized coating.

2. A print station of a three-dimensional ("3D") printing apparatus, the print station comprising:
    a substrate configured to hold a printed object, the substrate having a longitudinal axis; and
    a print system over the substrate, the print system including:
        a powder distribution device including a blade-shaped end which is a lowest portion of the powder distribution device; and
        a powder uniformization device, comprised of a roller, located at a distance from the powder distribution device along a direction parallel to the longitudinal axis,
        wherein the powder distribution device comprises at least one of a dehumidifier and an inert gas enclosed therein.

3. The print station of claim 1, wherein the powder distribution device is adjustable in height relative to the substrate to adjust a first thickness of a powder feeder gap between the blade-shaped end and the substrate.

4. The print station of claim 2, wherein the powder distribution device is adjustable in height relative to the substrate to adjust a first thickness of a powder feeder gap between the blade-shaped end and the substrate.

5. The print station of claim 1, wherein the powder uniformization device is adjustable in height relative to the substrate to adjust a final thickness of a roller gap between the roller and the substrate.

6. The print station of claim 2, wherein the powder uniformization device is adjustable in height relative to the substrate to adjust a final thickness of a roller gap between the roller and the substrate.

7. The print station of claim 1, wherein the powder distribution device comprises a powder feeder, and wherein the print station further comprises:
    a first adjustment mechanism configured to adjust the first thickness of the powder feeder gap between the blade-shaped end of the powder feeder and the substrate; and
    a second adjustment mechanism configured to adjust the final thickness of the roller gap between a lowest portion of the roller and the substrate,
    wherein the first and second adjustment mechanisms are independently adjustable.

8. The print station of claim 7, wherein the powder feeder gap is dynamically adjustable to promote a uniform powder in front of the roller.

9. The print station of claim 2, wherein the powder distribution device comprises a powder feeder, and wherein the print station further comprises:
    a first adjustment mechanism configured to adjust the first thickness of the powder feeder gap between the blade-shaped end of the powder feeder and the substrate; and
    a second adjustment mechanism configured to adjust the final thickness of the roller gap between a lowest portion of the roller and the substrate,
    wherein the first and second adjustment mechanisms are independently adjustable.

10. The print station of claim 9, wherein the powder feeder gap is dynamically adjustable to promote a uniform powder in front of the roller.

11. The print station of claim 1, wherein the powder uniformization device comprises a counter-rotating roller.

12. The print station of claim 11, wherein the counter-rotating roller is configured to provide an adjustable angle such that accumulated powder on the substrate is released behind the counter-rotating roller.

13. The print station of claim 2, wherein the powder uniformization device comprises a counter-rotating roller.

14. The print station of claim 13, wherein the counter-rotating roller is configured to provide an adjustable angle such that accumulated powder on the substrate is released behind the counter-rotating roller.

15. The print station of claim 1, further comprising:
    a roller cleaning device configured to at least one of remove residual powder from the roller and apply an electric charge to the roller.

16. The print station of claim 2, further comprising:
    a roller cleaning device configured to at least one of remove residual powder from the roller and apply an electric charge to the roller.

17. The print station of claim 1, wherein:
the substrate is movable with respect to the print system along the longitudinal axis; and
the print system is static with respect to the longitudinal axis.

18. The print station of claim 2, wherein:
the substrate is movable with respect to the print system along the longitudinal axis; and
the print system is static with respect to the longitudinal axis.

19. The print station of claim 1, wherein both the print system and the substrate are movable with respect to each other along the longitudinal axis.

20. The print station of claim 2, wherein both the print system and the substrate are movable with respect to each other along the longitudinal axis.

\* \* \* \* \*